United States Patent [19]

Crossman

[11] Patent Number: 4,531,477
[45] Date of Patent: Jul. 30, 1985

[54] FISH CONCENTRATING DEVICE

[76] Inventor: Richard B. Crossman, 2451 Second Ave., W., Seattle, Wash. 98119

[21] Appl. No.: 595,709

[22] Filed: Apr. 2, 1984

[51] Int. Cl.³ .............................................. A01K 64/00
[52] U.S. Cl. ....................................................... 119/5
[58] Field of Search ........................................ 119/5, 3

[56] References Cited

U.S. PATENT DOCUMENTS

| | | | |
|---|---|---|---|
| 1,943,417 | 1/1934 | Bringman | 119/5 |
| 3,304,912 | 2/1967 | Hackman et al. | 119/5 |
| 3,512,503 | 5/1970 | Willinger | 119/5 |
| 3,651,785 | 3/1972 | Quinn | 119/5 |
| 4,120,265 | 10/1978 | Davis | 119/5 |

FOREIGN PATENT DOCUMENTS 2838531  3/1980  Fed. Rep. of Germany .......... 119/5

*Primary Examiner*—Robert P. Swiatek
*Assistant Examiner*—Kris R. Schulze
*Attorney, Agent, or Firm*—Keith D. Gehr

[57] ABSTRACT

The invention comprises a generally rectangular plate and a mounting system so that the plate can be mounted adjacent to and parallel to one wall of a fish containing enclosure, such as an aquarium. An elongated nozzle and water conduit are attached to one edge of the plate. In use, the nozzle directs a curtain of water transversely across the plate within the volume defined by the plate and enclosure wall. Fish are generally attracted to this faster moving water and preferentially move into the volume between the plate and enclosure wall. In an aquarium, this places them in a close up position where they can be easily watched by an observer.

12 Claims, 6 Drawing Figures

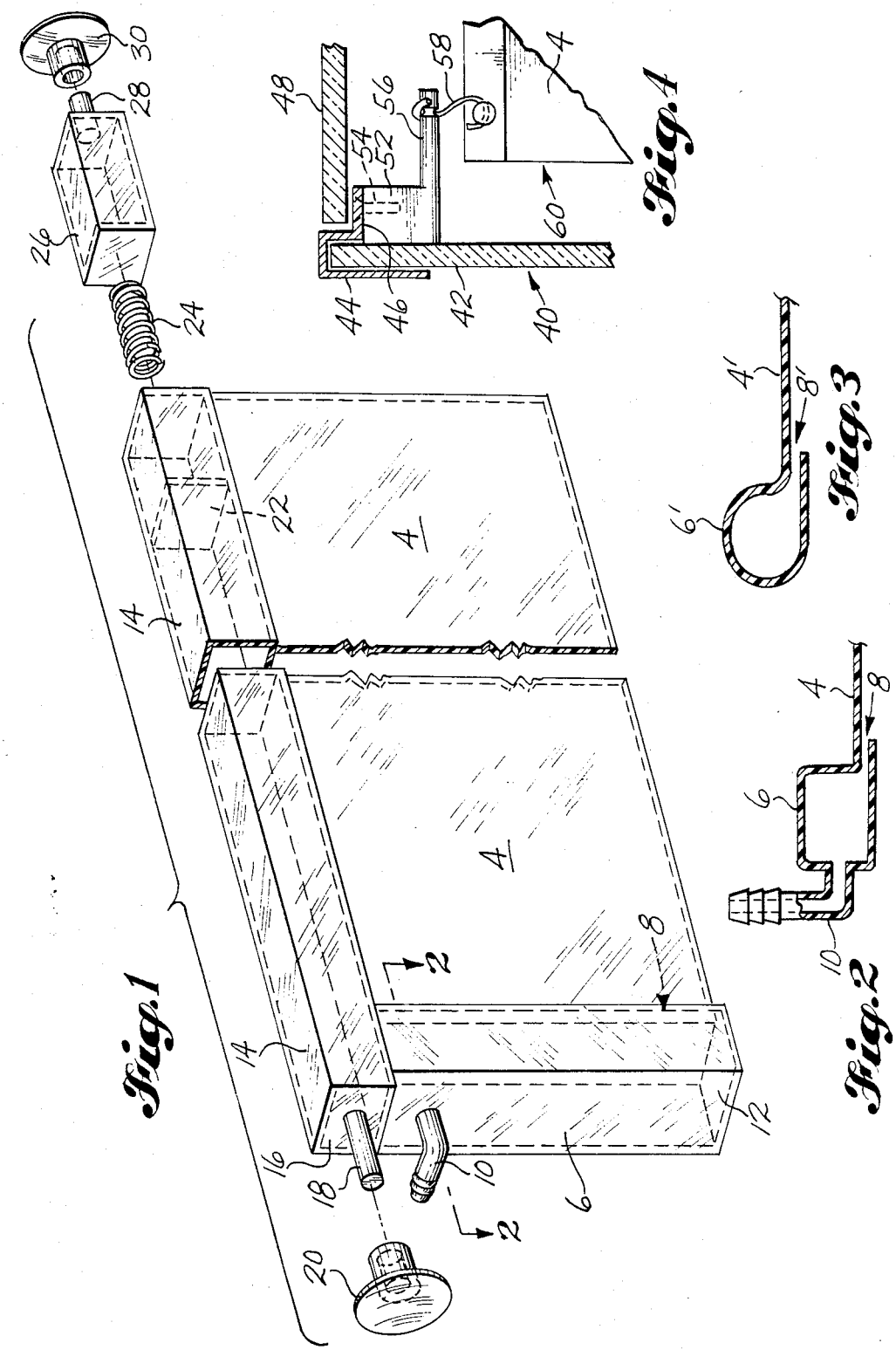

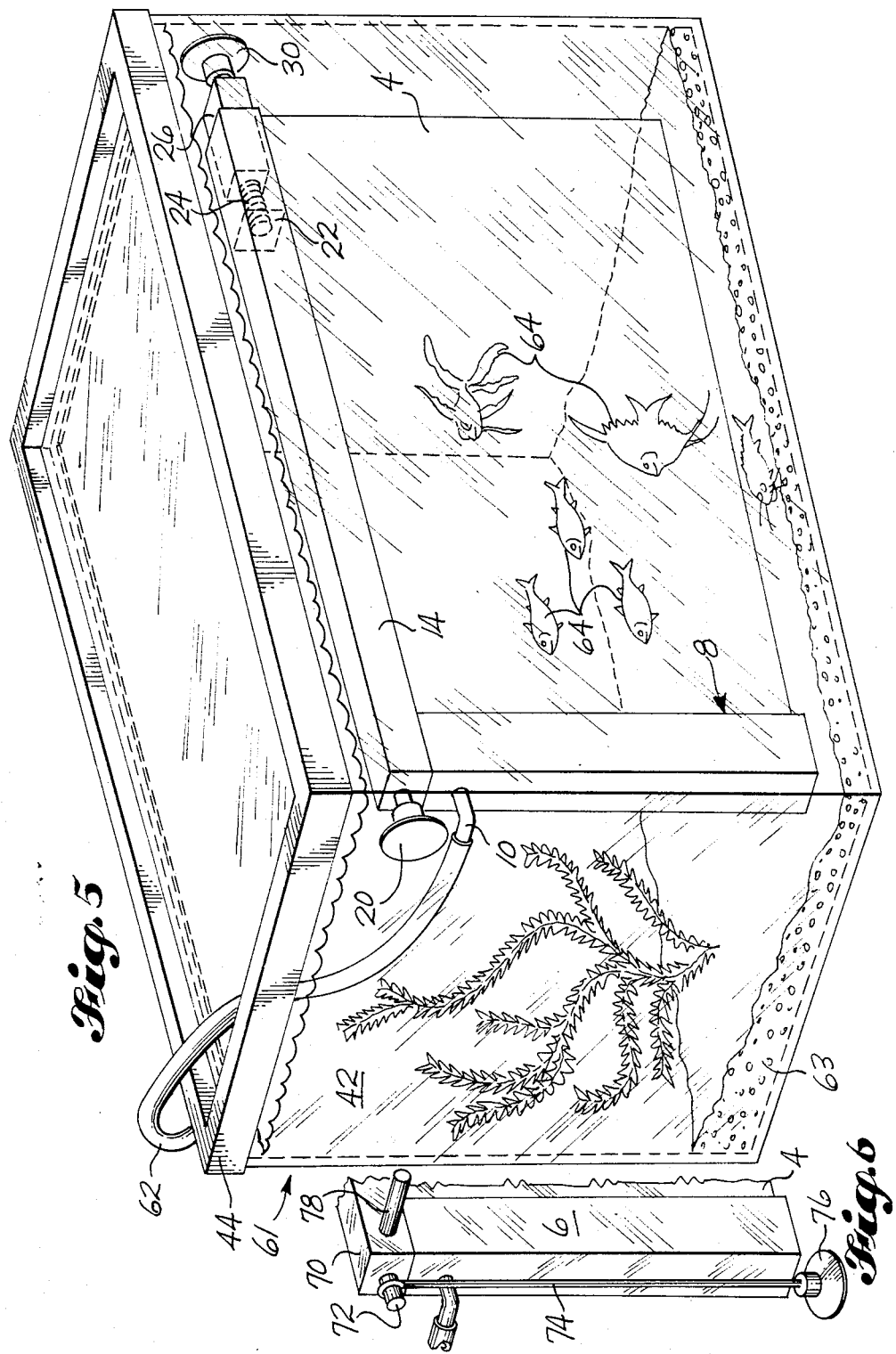

FISH CONCENTRATING DEVICE

BACKGROUND OF THE INVENTION

The present invention relates to a new device for concentrating fish into a localized volume of an enclosure. It is particularly useful for attracting fish into a limited volume adjacent to the front panel of an aquarium where they can be more readily observed.

In aquariums and other fish-holding enclosures, fish tend to be fairly widely distributed throughout the contained volume of water. There is one exception to this general rule. In enclosures such as hatchery raceways, the stream dwelling species will frequently congregate in the vicinity of water inlets. This may possibly be due to the higher oxygen content of the water at this location. However, this phenomenon appears, at least in part, to be due to the natural tendency of stream dwelling fish to face in the direction of a flowing current. Scantlin, in U.S. Pat. No. 3,921,584, discloses a fish display device which, while not so restricted, could be installed on a hobbyist aquarium. This contains a maze and, optionally, a water impeller to produce a current flowing through the maze. The inventor states that the fish are thus encouraged to swim against the current.

Fish display and culture is very popular among home hobbyists. A significant industry has sprung up to supply appropriate species of fish and equipment to these hobbyists. Home aquariums generally hold between 10 and 50 gallons of water. It is essential to have additional support equipment such as circulating systems, aerators, and filters to maintain a healthy environment for the fish on a continuing basis. These purification systems will filter out or biologically degrade the waste products of the fish, uneaten food residues, and other organic contamination.

The bottom surface of an aquarium is usually covered with gravel. This serves as an anchoring matrix for plants which enhance the attractiveness of the aquarium setting and provide resting cover for the contained fish. The plants also serve as biological cleaning devices by metabolizing nitrogenous residues and by contributing oxygen to the water. The gravel also serves as a matrix for bacteria which assist the purification process.

As those who have observed aquariums are well aware, the fish seem to have a perverse tendency to hide at the very time the viewer would like to see them close up. The present device provides a solution to this problem.

SUMMARY OF THE INVENTION

The present invention is directed to a device which, in its broadest concept, is useful for concentrating fish within a limited volume in any type of enclosure. It is particularly useful for attracting fish to the region adjacent to the front panel of an aquarium. While the invention will be described in conjunction with a conventional aquarium, it will be understood by those skilled in the art that it will be equally applicable to other types of enclosures.

One reason for the success of the present invention may be that most species of fish sold to hobbyists find their origin in fresh water streams rather than lakes or salt water. As such, these fish have a natural tendency to be attracted to and swim against a flowing current of water.

The apparatus itself comprises a generally rectangular plate suitable for forming a barrier wall. In most installations it will be preferable to this plate to be a colorless transport material, such as glass or an acrylic plastic. An elongated slit-like nozzle will be mounted along one edge of the plate. This nozzle has an inlet means in communication with a supply of water and is located so as to direct a curtain of water transversely across one face of the plate. The device further includes a means for mounting the plate within the enclosure. It will normally be mounted adjacent to and parallel to one wall of the enclosure so as to define a limited volume between the plate and the enclosure. This volume is small compared with the total volume of the enclosure. Some aquariums have walls that are in the form of simple or compound curves. It is within the scope of the invention when used in an enclosure of this type to form the plate in a corresponding configuration so that the volume thus defined between the plate and enclosure wall is of essentially uniform thickness. When thus in place within the enclosure, the nozzle directs a transverse flow of water across the limited volume. During use, areas are provided at either end of the mounted plate to allow access and egress for fish. The current of water created between the transparent plate and one panel of the aquarium becomes attractive to fish and they will preferentially swim into the moving water zone.

The nozzle means is usually formed as a longitudinal slit in a liquid conduit attached to one edge of the plate. This conduit may be made integrally by rolling or otherwise forming one edge of the plate and enclosing the ends.

The lower longitudinal edge of the transparent plate will generally be imbedded in the gravel at the bottom of the aquarium. The upper transverse edge of the plate is normally supported by the mounting means which can assume several different forms.

It is an object of the present invention to provide an apparatus for concentrating fish within a limited volume of an enclosure.

It is another object of the invention to provide an apparatus for concentrating fish adjacent to the front panel of an aquarium where they can be more easily seen by an observer.

These and many other objects will become readily apparent on reading the following detailed description taken in conjunction with the drawings.

BRIEF DESCRIPTION OF THE DRAWINGS

FIG. 1 is a perspective view of one embodiment of the device.

FIG. 2 is a section taken along line 2—2 showing a cross section of one version of a water conduit and nozzle means.

FIG. 3 is an alternative construction to that shown in FIG. 2.

FIG. 4 is an alternative suspension system to that shown in FIG. 1.

FIG. 5 is a perspective view of the fish concentrating device of FIG. 1 shown mounted within an aquarium.

FIG. 6 shows an additional suspension means for the device.

DETAILED DESCRIPTION OF THE PREFERRED EMBODIMENTS

The construction of the device itself can be readily seen by reference in FIGS. 1–3. The main portion of the device consists of a transparent colorless plate of glass or acrylic plastic 4,4'. At the left hand edge is seen a conduit 6,6' which, in the illustrations shown, is made integral with a plate 4 of thermoforming. One edge of the conduit 8,8' is left open so as to form a narrow slit running the full length of conduit 6. In use, this acts as a nozzle to direct a rapidly moving curtain of water transversely across the face of plate 4. A nipple 10 is provided in the conduit so that it may be in communication with a source of water under relatively low pressure. The conduit is closed at the bottom by a plate 12 which is adhesively or otherwise bonded. The opposite end is closed by the square transparent tubing 14, which also serves as a portion of the mounting means. The left hand end of tubing 14 is closed by plate 16 which bears a protruding mounting rod 18. This rod is adapted to be held in a suction cup or similar device 20 which is attached to an interior wall of an aquarium. Near its right hand end, square tubing 14 is closed by internal plate 22. This serves as a bearing surface for a light spring 24 and a piston 26 sized so as to loosely fit within square tube 14. The outer end of this piston bears a mounting rod 28 and, like its counterpart rod 18, is adapted to fit into a suction cup 30 attached to the opposite side wall of an aquarium.

Conduit 6 may be either formed integrally, as shown in FIGS. 2 and 3, or it may be a separate piece which is adhesively or otherwise bonded to the edge of plate 4.

FIG. 4 shows an alternative means of suspending the device within an aquarium. A cut away section of an aquarium 40 contains a glass or plastic sidewall 42 and a metal or plastic rim molding 44. This rim molding contains a flange 46 normally used to support a transparent coverplate 48. In the version shown, an L-shaped mounting bracket 52 is mounted snugly against side wall 42 of the aquarium and held in place by a screw or other fastening device 54 which ties the bracket to flange 46 of the rim molding 44. This mounting bracket has a short arm 56 which, in a normal aquarium, would be about 2 to 5 cm in length. The upper edge of the plate assembly 60 is suspended from arm 56 by a short hook or chain 58.

FIG. 5 is an example of the device mounted within an aquarium, generally indicated at 61. Plate 4 would normally be mounted 2 to 3 cm behind the front panel of the aquarium. Hose 62, connected to inlet nipple 10, is in communication with a source of water from an external pump or, alternatively with an internal pump, such as an under gravel power head.

It is preferable for the lower edge of plate 4 to be imbedded in the layer of gravel on the bottom surface of the aquarium. This effectively serves to retain it in operating position in conjunction with the mounting means. In use, a flow of water from nozzle or slit 8 creates a venturi effect that tends to pull the plate 4 toward the front wall of the aquarium. It is thus desirable that both the top and bottom longitudinal edges be restrained in some manner. The mounting means accomplishes this for the upper edge and the gravel serves this purpose for the lower edge. During use, water will flow from nozzle 8 in a direction from left to right creating a moving stream within the limited volume defined by plate 4 and the front wall of the aquarium. This moving water is attractive to the fish 64 who tend to swim against the direction of flow as opposed to remaining in the more nearly quiescent water comprising the bulk of the volume of the aquarium.

An alternative means of mounting the device is shown in FIG. 6. The upper edge of the plate contains a relatively simple stiffening member 70 containing a stub end 72. This end is cradled within an eye at the top of a suspension rod 74 which, in turn, is mounted in a suction cup 76 attached to the bottom plate of the aquarium. A spacer 78, at the top of the plate, restrains the upper edge from moving in toward the front panel of the aquarium due to the venturi effect created by the nozzle when in use.

Having thus disclosed the best mode know to applicant of making and practicing the present invention, it will be evident to those skilled in the art that many variations could be made without departing from the spirit of the present invention. The invention should be considered to be limited only by the following claims.

What is claimed is:

1. Apparatus for concentrating fish within a limited volume in an enclosure which comprises:
   a generally rectangular plate means suitable for forming a barrier wall;
   elongated nozzle means mounted along substantially the full length of one vertical edge of the plate means, the nozzle means adapted for connection to a water supply and located so as to direct a curtain of water across one face of the plate means; and
   mounting means for vertically mounting the plate means in the enclosure in a manner so as to permit defining a limited volume relatively small compared with the rest of the aquarium between said one face of the plate means and one wall of the enclosure, said volume being subject to a transverse flow of water from the nozzle means.

2. The apparatus of claim 1 in which the plate means is transparent.

3. The apparatus of claim 1 in which the nozzle means is in the form of a slit in the edge of conduit and the conduit is integral with the plate means and formed by rolling one edge of the plate.

4. The apparatus of claim 1 in which the mounting means is formed from a rigid member joined to the upper edge of the plate means at essentially right angles to the nozzle means, the mounting means further including anchoring means attachable to the enclosure walls so as to hold the rigid member.

5. The apparatus of claim 4 in which the rigid member has axially protruding end portions insertable into the anchoring means.

6. The apparatus of claim 5 in which at least one of the axially protruding end portions is adapted to telescope within the rigid member, the apparatus further including spring biasing means acting to urge the telescoping end portion outward.

7. The apparatus of claim 6 in which the anchoring means comprises suction cups.

8. The apparatus of claim 1 in which the mounting means comprises members attached to each edge of the plate means essentially parallel to the nozzle means, the mounting means further including anchoring means attachable to the bottom of the enclosure so as to receive and hold the members.

9. The apparatus of claim 8 in which the anchoring means comprises suction cups.

10. The apparatus of claim 8 which further includes spacer means attached to the top edge of the plate, said spacer means being adapted to control the distance between the plate and the enclosure wall.

11. In combination in an aquarium, apparatus for concentrating fish within a limited volume adjacent to one wall of the aquarium which comprises:

a plate means acting as a barrier wall located adjacent to and generally parallel to one wall of the aquarium so as to define a limited volume which is relatively small compared with the total volume of the aquarium, said plate means being shorter than the adjacent facing aquarium wall and positioned to allow fish access into the limited volume from each end of the plate means;

elongated nozzle means mounted along one vertical edge of the plate means, the nozzle means adapted for connection to a water supply and locared so as to direct a curtain of water across one face of the plate means and create a flow of water across the limited volume; and mounting means for vertically mounting the plate means in the aquarium.

12. The combination of claim 11 in which the surface configuration of the plate means essentially conforms to the surface configuration of the facing aquarium wall so as to define a restricted volume of essentially uniform thickness.

* * * * *